United States Patent
Weng et al.

(10) Patent No.: US 8,598,261 B2
(45) Date of Patent: Dec. 3, 2013

(54) POLYMER-CLAY NANOCOMPOSITE AND PROCESS FOR PREPARING THE SAME

(75) Inventors: Weiqing Weng, Houston, TX (US); James P. Stokes, Katy, TX (US); Edmund J. Stachowski, III, Houston, TX (US); Molly J. Upton, Baytown, TX (US); Robert N. Webb, Kingwood, TX (US); Ramesh Varadaraj, Flemington, NJ (US); Cornelius H. Brons, Easton, PA (US); David J. Lohse, Bridgewater, NJ (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 205 days.

(21) Appl. No.: 13/121,415

(22) PCT Filed: Oct. 14, 2008

(86) PCT No.: PCT/US2008/079857
§ 371 (c)(1),
(2), (4) Date: Jun. 22, 2011

(87) PCT Pub. No.: WO2010/044776
PCT Pub. Date: Apr. 22, 2010

(65) Prior Publication Data
US 2011/0250372 A1    Oct. 13, 2011

(51) Int. Cl.
*C08K 3/34* (2006.01)
*C08J 5/14* (2006.01)

(52) U.S. Cl.
USPC ............................................ 524/445; 523/156

(58) Field of Classification Search
USPC .......................................................... 524/445
See application file for complete search history.

(56) References Cited

U.S. PATENT DOCUMENTS

| | | | |
|---|---|---|---|
| 7,501,460 B1 * | 3/2009 | Weng et al. | 523/351 |
| 7,884,152 B2 * | 2/2011 | Kwak et al. | 524/446 |
| 2005/0065266 A1 | 3/2005 | Yang et al. | |
| 2007/0015853 A1 | 1/2007 | Weng et al. | |

FOREIGN PATENT DOCUMENTS

| | | |
|---|---|---|
| WO | WO02/100935 | 12/2002 |
| WO | WO02/100936 | 12/2002 |
| WO | WO2004/058874 | 7/2004 |
| WO | WO2006/085957 | 8/2006 |
| WO | WO2007/015853 | 2/2007 |
| WO | WO2008/045012 | 4/2008 |

* cited by examiner

*Primary Examiner* — Hui Chin
(74) *Attorney, Agent, or Firm* — Nancy T. Krawczyk

(57) ABSTRACT

A process for producing a nanocomposite of a halogenated elastomer and an inorganic, exfoliated clay includes the in-situ protonation of a modifier, which may be an alkylamine, arylamine or an alkylarylamine. This process can be integrated with a polymer halogenation process. The nanocomposite so formed has improved air barrier properties and is suitable for use as a tire innerliner or innertube.

13 Claims, 2 Drawing Sheets

POLYMER-CLAY NANOCOMPOSITE AND PROCESS FOR PREPARING THE SAME

CROSS REFERENCE TO RELATED APPLICATIONS

This application is a 371 National Stage Application of International Application No. PCT/US2008/079857, filed Oct. 14, 2008, the disclosures of which are herein incorporated by reference in their entireties.

FIELD OF THE INVENTION

This invention relates to a new process for producing low-permeability nanocomposites which are useful for air barriers such as tire innerliners. This new process uses an in-situ protonated modifier. The invention also relates to nanocomposites made by this process and articles comprising the nanocomposites.

BACKGROUND OF THE INVENTION

Isobutylene-based polymers, such as isobutylene-isoprene and isobutylene-paramethylstyrene copolymers, as well as halogenated variants thereof exhibit considerably lower air permeabilities than other elastomers, and this has led to their being the material of choice for the inner tubes and innerliners that act to retain the air pressure in nearly all modern pneumatic tires. However, there is a continuing need to improve the air retention characteristics of such components even further, in order to improve their performance in terms of energy efficiency and safety. One route to such improvements has been the synthesis of polymer-clay nanocomposites, wherein nanometer-scale clay sheets are dispersed within the polymer to lower their air permeability even further.

Nanocomposites are polymer systems containing inorganic particles with at least one dimension in the nanometer range, e.g. inorganic substances from the general class of "phyllosilicates". Ideally, intercalation should take place in the nanocomposite, wherein the polymer inserts into the space or gallery between the clay surfaces. Ultimately, it is desirable to have exfoliation, wherein the polymer is fully dispersed with the individual nanometer-size clay platelets. Due to the general enhancement in air barrier qualities of various polymer blends when clays are present, there is a desire to have a nanocomposite with low air permeability, e.g. for use in the manufacture of tires.

The preparation of nanocomposites uses a number of methods to generate exfoliated clays. One of the most common methods relies upon the use of organically modified montmorillonite clays. Organoclays are typically produced through solution based ion-exchange reactions that replace sodium ions on the surface of sodium montmorillonite with organic molecules such as alkyl or aryl ammonium compounds and typically known in the industry as swelling or exfoliating agents. Among the deficiencies of this method can be the limited thermal stability of the ammonium compounds, the lack of chemical bonding with the matrix, often leading to poor mechanical properties and increased hysteresis, and the negative impact the released amines and degradation products have on the transport properties. WO 2004/058874 discloses a process of preparing nanocomposites from organically-modified clays, butyl rubber and a polymeric exfoliant.

Another method used in the art to improve the organoclay performance is to combine functionalized polymers with the clay. This approach has been limited to materials that are soluble in water or to materials that can be incorporated into the polymerization reaction. This approach has been used to prepare nylon nanocomposites, using for example, oligomeric and monomeric caprolactam as the modifier. Polyolefin nanocomposites, such as polypropylene nanocomposites, have utilized maleic anhydride grafted polypropylenes to achieve some success in the formation of nanocomposites.

Elastomeric nanocomposite innerliners and innertubes have also been formed using a complexing agent and a rubber, where the agent is a reactive rubber having positively charged groups and a layered silicate uniformly dispersed therein. However, this approach to improving air barriers has limited usefulness due to the need for pre-formed positively charged reactive rubber components.

Nanocomposites have also been formed using non-ionic, brominated copolymers of isobutylene and para-methylstyrene, and blends of these copolymers with other polymers. However, it has been found that the efficiency of clay exfoliation, as determined by the relative permeability reduction, is not as high as that achieved in routes involving ionic interaction. Nanocomposites made of clay and amino-functionalized halogenated elastomers are disclosed in WO 02/100935. Nanocomposites comprising an interpolymer and clay treated with an exfoliating additive are disclosed in WO 02/100936.

WO 2008/045012 discloses a process to produce a nanocomposite comprising the steps of mixing an aqueous slurry of clay with a solution of polymer in an organic solvent to form an emulsion comprising a polymer-clay nanocomposite, and recovering the nanocomposite from the emulsion. The polymer may be pre-functionalized e.g. with an amine group in order to increase interaction with the clay.

As described above, nanocomposites are made in the art by mixing of elastomers and organoclays either at the melt state or in solution; and, due to the hydrophobic nature of the polymer, the organoclays (and/or the polymers) are typically modified to provide better interaction between the clays and the polymers. This process is expensive and most modified clays are not exfoliated in polymers or in organic solvent.

Thus, there is still a need in the art for a process of preparing a polymer/clay nanocomposite with improved exfoliation of the clay and increased interaction between the clay and the polymer. There is also need for a less costly process to produce polymer/clay nanocomposites using inorganic clay without organic modification or without using polymer that has been pre-functionalized. Additionally, if the polymer is halogenated rubber, ideally, a process for preparing nanocomposites of clay and halogenated rubber should be capable of being integrated into the halogenated rubber production process. Finally, there is still a need in the art for polymer/clay nanocomposites having even better air barrier properties (i.e., lower oxygen transmission rates) than existing nanocomposites while maintaining good processability, and that can be used in applications such as tire innerliners where toughness and low air permeability are required.

SUMMARY OF THE INVENTION

The present invention in a first aspect relates to a process of preparing a nanocomposite of polymer and clay, comprising the steps of:
(a) contacting (i) a solution of a polymer in an organic solvent, (ii) an aqueous slurry of a clay, (iii) a modifier, and (iv) a Brønsted acid to form an emulsion;
(b) mixing the emulsion to form the nanocomposite; and
(c) recovering the nanocomposite from the emulsion.

Although (i), (ii), (iii) and (iv) can be contacted in any order, preferably in step (a) a first mixture comprising the polymer solution and the Brønsted acid, and a second mixture comprising the aqueous clay slurry and the modifier are provided, and the first and the second mixture are combined to form the emulsion. Most preferably, the first mixture is the effluent of a polymer halogenation reactor. In this process, the modifier is protonated in situ by the Brønsted acid.

The present invention in a second aspect relates to a process for halogenating a polymer, the process comprising the steps of:
(a) providing a solution of the polymer in an organic solvent,
(b) contacting said polymer solution with halogen in a reactor under halogenation conditions to form halogenated polymer and hydrogen halide,
(c) contacting the effluent stream of the halogenation reactor of step (b) comprising halogenated polymer and hydrogen halide with an aqueous slurry of a clay and with a modifier to form an emulsion,
(d) mixing the emulsion to form a nanocomposite of halogenated polymer and clay, and
(e) recovering the nanocomposite from the emulsion. Again, the modifier is protonated in situ by the Brønsted acid.

The present invention in a third aspect relates to a nanocomposite comprising a polymer and a clay, prepared by any of the processes mentioned hereinabove.

In a fourth aspect the present invention relates to a composition comprising the nanocomposite mentioned above and optionally one or more components selected from the group consisting of secondary rubbers, fillers, curative systems, processing aids, stabilizers, antioxidants and pigments. Said composition when cured preferably has an air permeability characterized by an oxygen transmission rate at 40° C. of 100 mm cm$^3$/(m$^2$ day) or less.

In a fifth aspect the present invention also relates to an article comprising the composition mentioned hereinabove. The article is preferably a tire, or a part of a tire, such as a tire innerliner, tire innertube, tire sidewall or tire thread.

DESCRIPTION

Figure 1:
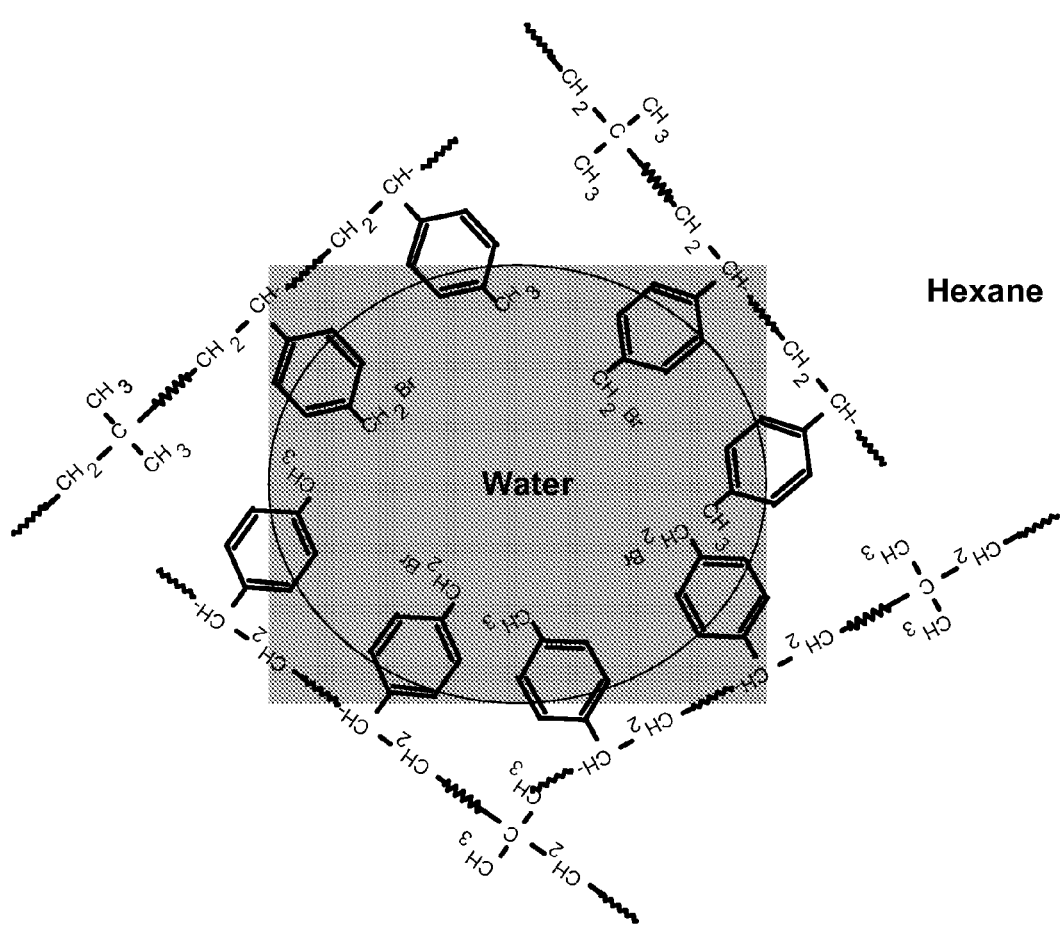
FIG. 1 illustrates the surface-active nature of halogenated isobutylene-paramethylstyrene polymers, and schematically shows the aggregation of the aromatic groups at the hydrocarbon/water interface.

The present invention provides a new process for preparing a nanocomposite, which process differs from known processes in that it uses an unmodified polymer and an unmodified clay, and that the modifier is protonated in situ by a Brønsted acid. This process provides for an increased interaction between polymer and clay, and results in nanocomposites with improved air barrier properties.

General Definitions

As used herein, "polymer" may refer to a homopolymer, copolymer, terpolymer, etc. A "copolymer" may refer to a polymer comprising at least two types of monomers, optionally in combination with further monomers. The term "interpolymer" has the same meaning as the term "copolymer" and is used interchangeably herein.

As used herein, when a polymer is referred to as "comprising" a monomer, the monomer is present in the polymer in the polymerized form of the monomer (also referred to as the derivative form the monomer). For example, if isobutylene is used as monomer, the polymer contains isobutylene (derived) units.

As used herein, "elastomer" or "elastomeric composition" refers to any polymer or composition of polymers (such as blends of polymers) consistent with the ASTM D1566 definition. Elastomers include mixed blends of polymers such as melt mixing and/or reactor blends of polymers. The term "elastomer" is identical in meaning and used interchangeably with the term "rubber."

As used herein, "phr" means "parts per hundred rubber" and is a measure common in the art wherein components of a composition are measured relative to the total elastomer content, based upon 100 parts by weight of the total elastomer. So, for example, if a component is present in a composition in 50 phr it is present in an amount that is 50% (by weight) of the amount of total elastomer present in the composition. The total elastomer content may be composed of several elastomers.

As used herein, "isoolefin" refers to any olefin monomer containing at least one carbon atom having at least three other carbon atoms attached to it, for example isobutylene, isopentene etc. Another term of the same meaning and used interchangeably herein is "branched olefin" (as opposed to a straight chain, n-olefin). All isomers of such isoolefins are understood to be comprised by these terms.

As used herein, "multiolefin" refers to any olefin monomer having two or more unsaturations (typically double bonds), for example, a multiolefin may be any monomer comprising two conjugated double bonds, such as a conjugated diene, e.g. isoprene.

As used herein, a "styrene" monomer refers to unsubstituted or substituted styrene, as further detailed below. Specifically, alkylstyrene is such substituted styrene.

As used herein, "butyl rubber" refers to any isobutylene-based rubber, and "isobutylene-based rubber" means rubber containing at least 70 mol % isobutylene units, based on the total amount of monomer units in the rubber.

As used herein, "nanocomposite" or "nanocomposite composition" refers to polymer systems containing inorganic particles (so-called "nano-clays") with at least one dimension (such as the thickness) in the nanometer range, i.e., from about 1 to about 100 nm, dispersed within a polymer matrix.

As used herein, "intercalation" refers to the state of a composition in which a polymer is present between the layers of a platelet filler. As is recognized in the industry and by academia, some indicia of intercalation can be the shifting and/or weakening of detection of X-ray lines as compared to that of original platelet fillers, indicating a larger spacing between clay layers than in the original mineral.

As used herein, "exfoliation" refers to the separation of individual layers of the original inorganic particle, so that polymer can surround or surrounds each particle. If sufficient polymer is present between the platelets, the platelets can be randomly spaced. For example, some indication of exfoliation or intercalation may be a plot showing no X-ray lines or larger d-spacing because of the random spacing or increased separation of layered platelets. However, as recognized in the industry and by academia, other indicia may be useful to indicate the results of exfoliation such as permeability testing, electron microscopy, atomic force microscopy, etc.

As used herein, "solvent" refers to any substance or mixture of substances capable of dissolving another substance. When the term "solvent" is used it may refer to at least one solvent or two or more solvents unless specified. Generally, solvents can be polar or unpolar.

As used herein, "solution" refers to a uniformly dispersed mixture at the molecular level or ionic level, of one or more substances (solute) in one or more substances (solvent).

As used herein, "suspension" or "slurry" (which terms are used interchangeably herein) refers to a system consisting of a solid dispersed in a solid, liquid, or gas, usually in particles of larger than colloidal size.

As used herein, "emulsion" refers to a system consisting of a liquid or liquid suspension dispersed in another immiscible liquid usually in droplets of larger than colloidal size.

As used herein, "Brønsted acid" refers to a compound that is capable of donating a proton ($H^+$) to another compound. Details regarding the Brønsted acid as well as a detailed definition and explanation of the modifier are given hereinbelow.

Detailed Description

In the following, the present invention in all its aspects will be described in detail, first with respect to the components and then with respect to the processes of the present invention for preparing the nanocomposites, and finally with respect to the nanocomposites themselves.

Polymer

In all aspects of the present invention, the polymer in the nanocomposite may generally be any polymer (or polymer blend) suitable as a polymer matrix to form a nanocomposite with (exfoliated) clay. More specifically, the polymer used in the present invention is an elastomer, and may or may not be halogenated. Specifically, in the process of preparing a nanocomposite according to the first aspect of the invention, the polymer that is dissolved in an organic solvent is preferably a halogenated elastomer. Consequently, the unhalogenated polymer referred to in the process of the second aspect of the present invention is the corresponding polymer but without (i.e., prior to) the halogenation. Such unhalogenated polymer, prior to halogenation, is also called the "backbone polymer". Apart from the halogenation, the polymer used in the nanocomposites of the present invention is preferably unfunctionalized. In particular, the polymer is preferably not pre-functionalized with a modifier (or protonated modifier) according to the invention as further defined hereinbelow prior to being contacted with the aqueous slurry of clay.

Thus, the nanocomposite of all aspects of the present invention preferably includes at least one halogenated elastomer comprising $C_4$ to $C_7$ isoolefin-derived units. The isoolefin is preferably a $C_4$ to $C_6$ compound, such as isobutylene, 2-methyl-1-butene, 3-methyl-1-butene, 2-methyl-2-butene, and 4-methyl-1-pentene.

The elastomer may also contain other monomer derived units, such as styrenic units and/or multiolefinic units. In one embodiment, the halogenated elastomer comprises at least one styrenic monomer, which may be any substituted styrene monomer unit, and desirably is selected from styrene, α-methylstyrene or an ortho, meta, or para alkylstyrene, the alkyl being selected from any $C_1$ to $C_5$ linear or branched alkyl. In a desirable embodiment, the styrenic monomer is p-methylstyrene. In one embodiment, the halogenated elastomer includes an isoolefin derived unit, a multiolefin derived unit and/or a styrene derived unit.

The halogenated elastomers in one preferred embodiment of the invention are random elastomeric copolymers of a $C_4$ to $C_7$ isoolefin, such as isobutylene, and a para-alkylstyrene comonomer, preferably para-methylstyrene, containing at least 80%, more preferably at least 90% by weight of the para-isomer.

Most useful are interpolymers of isobutylene and para-methylstyrene containing from 0.5 to 20 mol % para-methylstyrene, wherein up to 60 mol % of the methyl substituent groups on the phenyl ring contain a bromine or chlorine atom, preferably a bromine atom. These elastomers are commercially available as Exxpro™ Elastomers (ExxonMobil Chemical Company, Houston Tex.), and abbreviated here as "BIMS".

These interpolymers preferably have a substantially homogeneous compositional distribution such that at least 95% by weight of the polymer has a para-alkylstyrene content within 10% of the average para-alkylstyrene content of the polymer. Desirable interpolymers are also characterized by a narrow molecular weight distribution (Mw/Mn) of less than 5, more preferably less than 2.5, a preferred viscosity average molecular weight in the range of from 200,000 up to 2,000,000 and a preferred number average molecular weight in the range of from 25,000 to 750,000 as determined by gel permeation chromatography.

The BIMS polymers may be prepared according to methods known in the art by a slurry polymerization of the monomer mixture using a Lewis acid catalyst, followed by halogenation, preferably bromination, in solution in the presence of halogen and a radical initiator such as heat and/or light and/or a chemical initiator.

Preferred BIMS polymers are brominated polymers that generally contain from 0.1 to 5 mol % of bromomethylstyrene groups relative to the total amount of monomer derived units in the polymer, preferably from 0.2 to 3.0 mol %, more preferably from 0.3 to 2.8 mol %, more preferably from 0.3 to 2.5 mol %, most preferably from 0.4 to 2.0 mol %, wherein a desirable range may be any combination of any upper limit with any lower limit. Expressed another way, copolymers may contain from 0.2 to 10 weight % of bromine, based on the weight of the polymer, preferably from 0.4 to 6 weight % of bromine, more preferably from 0.6 to 5.6 weight % of bromine and are preferably substantially free of ring halogen or halogen in the polymer backbone chain. In one particularly preferred embodiment of the invention, the interpolymer is a copolymer of $C_4$ to $C_7$ isoolefin derived units, para-methylstyrene derived units and para-(halomethyl)styrene derived units, wherein the para-(halomethyl)styrene (preferably para-(halomethyl)styrene) units are present in the interpolymer from 0.4 to 3.0 mol % based on the total number of para-methylstyrene, and wherein the para-methylstyrene derived units are present from 3 weight % to 15 weight % based on the total weight of the polymer, preferably from 4 weight % to 10 weight %.

In another preferred embodiment of the invention, the halogenated elastomer component is a halogenated copolymer of a $C_4$ to $C_7$ isoolefin and a multiolefin. The multiolefin is a $C_4$ to $C_{14}$ conjugated diene such as isoprene, butadiene, 2,3-dimethyl-1,3-butadiene, myrcene, 6,6-dimethyl-fulvene, cyclopentadiene, hexadiene and piperylene. One embodiment of the copolymer of the invention is obtained by reacting 92 to 99.5 weight % of isobutylene with 0.5 to 8 weight % isoprene, preferably 95 to 99.5 weight % isobutylene with 0.5 to 5.0 weight % isoprene, and thereafter halogenating the copolymer.

Non-limiting commercial examples of halogenated isoolefin/multiolefin rubbers useful in the present invention are Bromobutyl 2222 and Bromobutyl 2255 (both available from ExxonMobil Chemical Company).

In a specific embodiment the halogenated elastomer of the invention may be a branched or "star-branched" halogenated butyl rubber. In one embodiment, the star-branched halogenated butyl rubber ("SBHR") is a composition of a butyl rubber, either halogenated or not, and a polydiene or block copolymer, either halogenated or not. The polydiene/block copolymer or branching agents (hereinafter "polydienes"), are typically cationically reactive and are present during the polymerization of the butyl or halogenated butyl rubber, or can be blended with the butyl or halogenated butyl rubber to form the SBHR. In one embodiment, the SBHR is typically a composition of the butyl or halogenated butyl rubber as described above and a copolymer of a polydiene and a partially hydrogenated polydiene selected from the group including styrene, polybutadiene, polyisoprene, polypiperylene, natural rubber, styrene-butadiene rubber, ethylene-propylene diene rubber, styrene-butadiene-styrene and styrene-isoprene-styrene block copolymers. These polydienes are present, based on the total monomer weight content, in greater than 0.3 weight % in one embodiment, preferably from 0.3 to 3 weight %, and more preferably from 0.4 to 2.7 weight %. A non-limiting commercial embodiment of an SBHR useful in the present invention is Bromobutyl 6222 (ExxonMobil Chemical Company).

Generally, the halogenated elastomers as referred to above are produced by the halogenation of the underlying backbone elastomers (i.e., the corresponding unhalogenated elastomers). Chlorination and bromination are preferred, and bromination is most preferred. Halogenation can be carried out by any means known in the art. For example, the elastomer can be halogenated in hexane diluent at from 40 to 60° C. using bromine ($Br_2$) or chlorine ($Cl_2$) as the halogenation agent. The halogenated elastomer may generally have a Mooney Viscosity of from 20 to 70 (ML 1+8 at 125° C.), preferably from 25 to 55. The halogen content may generally be from 0.1 to 10 weight %, preferably from 0.5 to 5 weight %, more preferably from 1 to 2.2 weight %, based on the total weight of the halogenated elastomer.

Halogenation of the polymers, preferably the elastomers as described above, used in the present invention can be carried out prior to the polymers being used in the process of making a nanocomposite according to the first aspect of the present invention. In the second aspect of the present invention, the halogenation itself is part of the process of the invention, with the effluent of the halogenation reactor (containing halogenated polymer and hydrogen halide) being further used to prepare the nanocomposite by contacting said effluent with the modifier and the aqueous clay slurry as explained below. One particular advantage of the present invention is that the process of making the nanocomposite can be integrated with the halogenation process, so that the effluent of the halogenation reactor containing halogenated polymer and hydrogen halide (which otherwise would have to be neutralized with caustic) can be used without further work-up and can directly be contacted with the aqueous clay slurry and the modifier. This is a more economical process than having to neutralize the acid and/or having to isolate the halogenated polymer.

The halogenated elastomer described above may be present in the nanocomposites of the invention from 10 to 100 phr, preferably from 15 to 90 phr, more preferably from 20 to 80 phr, and most preferably from 30 to 70 phr, wherein a desirable range may also be any combination of any upper phr limit with any lower phr limit. Additionally, secondary rubber components which can be used in certain embodiments in addition to the polymer, preferably the halogenated elastomer as explained above, are described below.

Organic Solvent

The organic solvent (for dissolving the polymer) in the processes of the present invention can be any suitable, hydrocarbon solvent that sufficiently dissolves the polymer, preferably the (halogenated) elastomer, to be used in the process of preparing the nanocomposite and/or the process of halogenating the polymer according to the first and second aspect, respectively, of the present invention. The organic solvent may also be a mixture of different hydrocarbons.

The solvents may comprise one or more alkanes, alkenes, aromatics, nitrated alkanes, halogenated alkanes, ethers, or mixtures thereof. Preferably the solvent comprises one or more $C_2$ to $C_{40}$, preferably $C_4$ to $C_{15}$ linear, branched or cyclic alkanes, alkenes, aromatics or ethers. Most preferably the solvent is selected from hexane, isohexane, cyclohexane, toluene, tetrahydrofuran, butane, isobutene, pentane, octane, isooctane, nonane, decane, undecane, dodecane, isododecane, any isomers thereof and any mixtures thereof.

The polymer solution may contain organic solvent from 30 to 99 weight %, preferably from 50 to 99 weight %, more preferably from 70 to 99 weight %, most preferably from 80 to 99 weight %, or alternatively from 70 to 90 weight %, preferably from 75 to 90 weight %, based upon the total weight of the solution of the polymer in the organic solvent as referred to in step (a) of the processes of both the first and the second aspect of the present invention.

Modifier

The modifier used in the present invention is a compound which is capable of being protonated by the Brønsted acid as described herein below. The modifier is preferably protonated by the Brønsted acid "in situ", i.e., while being in contact with the polymer solution, the aqueous slurry of clay, or both (as opposed to being protonated by the Brønsted acid prior to being contacted with the polymer solution and/or the clay slurry and as further opposed to the pre-functionalization of the polymer and/or the clay with the protonated or unprotonated modifier). If the process of the present invention for preparing a polymer/clay nanocomposite is integrated with a polymer halogenation process, preferably the modifier is protonated by the hydrogen halide that is present in the effluent of a polymer halogenation reactor. However, if the process for making the nanocomposite is not integrated with the polymer halogenation process, the Brønsted acid may also be separately added to the polymer solution and/or the aqueous clay slurry in order to protonate the modifier.

Generally, the modifier may be commonly referred to as a "surfactant", which has (when protonated) a hydrophilic portion and a lipophilic portion. Therefore, the terms "surfactant" or "emulsifier" have the same meaning herein as the term "modifier", and can be used interchangeably in the context of the present invention. The hydrophilic portion in the protonated modifier is usually a polar, ionic (cationic) species, such as ammonium, while the lipophilic (hydrophobic) portion is usually an unpolar, hydrocarbon portion such as an alkyl, aryl or combined alkyl/aryl chain. Any alkyl chain(s) in the modifier may be straight, branched or cyclic. If several aryl groups are present in the modifier, they may be either directly joined (by covalent bonds or by one or more shared carbon atoms), or they may be joined via an alkyl chain. An "alkylaryl" group means that the aryl part of this group is attached to the nitrogen atom of the amine (if the modifier is an amine), and one or more alkyl groups (straight, branched or cyclic) are attached to the aryl group. If the aryl group is a phenyl group, the alkyl group(s) may be attached to it in ortho, meta and/or para-position. An "arylalkyl" group means that that alkyl part of this group is attached to the nitrogen atom of the amine (if the modifier is an amine) and one or more aryl group(s) are attached to the alkyl group. The modifier can also carry several such amine groups, such as in a diamine or a polyamine.

In a preferred embodiment, the modifier according to all aspects of the present invention is an amine of the formula $NR_3$, wherein the groups R are identical or different and, independently of each other, are a hydrogen atom; an alkyl group having at least 5, preferably at least 10, more preferably at least 25 and in one embodiment at least 40, and up to 100 carbon atoms; an aryl group having from 5 to 25, preferably from 5 to 20, and more preferably from 5 to 15 carbon atoms; an alkylaryl group having from 5 to 50, preferably from 7 to 40, more preferably from 10 to 25 carbon atoms; an arylalkyl group having from 5 to 50, preferably from 7 to 40, more preferably from 10 to 25 carbon atoms; or an ether group having at least 5, preferably at least 10, more preferably at least 25, most preferably at least 40, and up to 100, carbon atoms; with the proviso that at least one group R is not a hydrogen atom. Any combinations of any alkyl, aryl, alkylaryl and arylalkyl groups as defined above and (a) hydrogen atom(s) in the modifier $NR_3$ of the present invention are explicitly included in the present disclosure.

In a particularly preferred embodiment $NR_3$ as defined above is an alkylarylamine and thus contains at least one alkylaryl group attached to the nitrogen atom with the two remaining groups R being preferably hydrogen atoms, wherein the alkylaryl group has from 7 to 40 carbon atoms. More preferably the modifier used in the present invention is an amine of the formula $NRH_2$ wherein R is an alkylaryl group (i.e., an aryl group substituted with at least one alkyl group) having from 10 to 25 carbon atoms. Even more preferably, in this alkylaryl group the alkyl part has from 7 to 25, more preferably 10, 11, 12, 13, 14, 15, 16, 17, 18, 19 or 20 carbon atoms, and is a straight-chain alkyl group, and the aryl group has from 6 to 14, more preferably from 6 to 10 carbon atoms. Preferably, one alkyl group having from 7 to 25 carbon atoms is attached in the para-position to the aryl group having from 6 to 10 carbon atoms. One such preferred modifier for use in the present invention is tetradecyl aniline, but other variants such as decyl aniline, undecyl aniline, dodecyl aniline, tridecyl aniline, pentadecyl aniline, hexadecyl aniline, heptadecyl aniline, octadecyl aniline, and any $C_{20}$ to $C_{44}$ aniline may also be used in any of their isomeric forms. Most preferred is the 4-tetradecyl aniline.

In another particularly preferred embodiment the modifier is an alkylamine of the formula $NR_3$ as defined above, wherein at least one of the groups R is not a hydrogen atom and is preferably an alkyl group having at least 5, preferably at least 10, more preferably at least 25 and most preferably at least 40 carbon atoms, and up to 100 carbon atoms, with the remaining groups R being preferably hydrogen atoms. One such preferred modifier for use in the present invention is polyisobutyleneamine ("PIB-amine"). PIB-amine is commercially available for example from BASF under the tradename KEROCOM PIBA 03. However, also other amines and quaternary ammonium salts can be used, for example, dioctadecyl amine and N,N-dimethyloctyl amine from Aldrich Alternatively, also quaternary ammonium salts $NR_4^+X^-$, with R being defined as above (in the context of $NR_3$, including any preferred meanings of R given above) and $X^-$ being a suitable counter-anion, preferably a halogenide, such as $Cl^-$ or $Br^-$, may be used as modifier. Preferably, in the ammonium salt $NR_4^+C^-$ at least one group R is an alkyl group having at least 10 carbon atoms, while the remaining groups R may be any combination of any of the above-defined groups. If a quaternary ammonium salt is used as the modifier, no separate protonation by a Brønsted acid is necessary. Arquad 12-37W and Ethoquad 18/25 from Akzo Nobel are (no-limiting) commercially available examples for such ammonium salts which may be used in the present invention.

According to all aspects of the present invention also a combination or mixture of two or more of any the above-described compounds may be used as the modifier. For example, the modifier may be a combination or mixture of one or more amines and/or ammonium salts. Thus, for simplicity, the term "modifier" (in the singular) is used herein both for one single modifier compound as well as for a mixture of two or more modifier compounds. The components of such mixture may be contacted with the polymer solution, the aqueous clay slurry and the Brønsted acid either separately (at the same time or consecutively), or they may be pre-combined and then contacted with the polymer solution, the aqueous clay slurry and the Brønsted acid. In a preferred embodiment of the present invention the modifier is a mixture of an amine $NR_3$ or $NRH_2$ as defined above and an ammonium salt $NR_4^+X^-$ as also defined above. The ratio of the amine to the ammonium salt may be (on a molar basis) from 1:5 to 5:1, preferably from 1:3 to 3:1, more preferably from 1:2 to 2:1. In one embodiment, the amine and the ammonium salt can be used in approximately equal (molar) amounts. In a particularly preferred embodiment, the modifier is a combination or mixture of PIB-amine and an ammonium salt $NR_4^+X^-$ as described in the paragraph above, wherein at least one group R is an alkyl group having at least 10 carbon atoms. Using a modifier mixture rather than one single modifier compound in certain circumstances makes it possible to further influence the resulting nanocomposite's properties and for example adjust its processing properties (Mooney viscosity) to the needs of a particular application.

The modifier suitable for use according to the present invention as defined above serves a dual function: as emulsifier for water and the organic solvent, and as exfoliating agent for the clay. Therefore, the modifier herein may also be called "bifunctional emulsifier-exfoliating agent". Interfacial tension measurements showed (see Example 23) that the modifiers as defined above significantly reduce the interfacial tension at the water/organic solvent interface in emulsions containing a polymer, preferably a halogenated interpolymer comprising $C_4$ to $C_7$ isoolefin and alkylstyrene monomer units, dissolved in an organic solvent, and an aqueous phase containing a Brønsted acid. Preferably, the modifiers of the present invention are compounds which reduce the interfacial tension (in dynes/cm, measured in accordance with the pendant drop tensiometry method) in an emulsion containing, as the aqueous phase, water containing 0.1M of a Brønsted acid (preferably HBr), and as the organic phase a solution of 0.1 wt. % of a polymer (preferably butyl rubber, more preferably a halogenated isobutylene/paramethylstyrene copolymer) in an organic hydrocarbon solvent (preferably an alkane, more preferably hexane), by a factor of 10 to 100, preferably at least 15, more preferably at least 20 and most preferably at least 30. It was also shown (see Example 24) that the water droplet size in such emulsions is considerably reduced in the presence of the modifiers as defined above.

The amount of modifier added may be calculated based on the cationic exchange capacity (CEC) of the clay, which has a unit of mmol per 100 g of clay. A preferred amount of modifier is from 1 to 99%, preferably from 5 to 60%, more preferably from 10 to 50%, and most preferably from 20 to 40% of the maximum molar cationic exchange ratio (MER) of the total weight of the clay added.

Brønsted Acid

The Brønsted acid used in the processes of the present invention can be any organic or inorganic compound that is capable of donating a proton ($H^+$) to another compound. Preferred examples of suitable Brønsted acids are hydrogen halides, such as hydrogen bromide (HBr), hydrogen chloride (HCl) and hydrogen fluoride (HF). HBr is preferred. However, other suitable Brønsted acids include sulfuric acid, nitric acid, phosphoric acid, carboxylic acids, such as acetic acid, and the like.

Theoretically, one molar equivalent of Brønsted acid is needed to protonate the modifier. In practice, the Brønsted acid used may be in a range from 90 to 250% of one molar equivalent, preferably, from 100 to 200% of one molar equivalent, more preferably from 100 to 150% of one molar equivalent of the modifier (amine). In case quaternary ammonium salts are used as modifiers, no acid is needed. Alternatively, modifier (amine) and Brønsted acid can be pre-combined, and the protonated modifier can then be used (with or without being isolated) further in the process of the present invention.

Clay

The nanocomposites of the present invention include inorganic clay, preferably swellable layered inorganic clay. The particles of such clay have at least one dimension in the nanometer range (i.e., from about 1 to about 100 nm). In the nanocomposite compositions of the invention the clays are preferably well dispersed and exfoliated. Swellable layered inorganic clay materials suitable for the purposes of this invention include natural or synthetic phyllosilicates, particularly smectic clays such as montmorillonite, nontronite, beidellite, bentonite, volkonskoite, laponite, hectorite, saponite, sauconite, magadite, kenyaite, stevensite and the like, as well as vermiculite, halloysite, aluminate oxides, hydrotalcite and the like. These layered clays generally comprise silicate particles or platelets in the nanometer range, tightly bound together at interlayer spacings of e.g. 4 Å or less. The layered clays comprise particles or platelets of less than 20 nm average thickness, preferably less than 10 nm, more preferably less than 5 nm, most preferably less than 3 nm, such as from 5 to 20 Å, preferably from 8 to 12 Å as measured by Transmission Electron Microscopy (TEM). These particles have an aspect ratio (length to thickness ratio) of about 100. The clays contain exchangeable cations such as $Na^+$, $Ca^{2+}$, $K^+$ or $Mg^{2+}$ present at the interlayer surfaces. However, the inorganic clays used in the present invention are preferably not organoclays, i.e., they are preferably not modified by exchange of these cations by organic cations such as those derived from organic ammonium salts. Rather, the inorganic clays are used in the present invention in their inorganic, unmodified form. For example, sodium montmorillonite clay such as Cloisite is used slurried in water without any prior organic modification. Rather, as will be described further below, a separate modifier (which serves as bifunctional emulsifier-exfoliator) is used as defined above, which is preferably protonated in-situ by the Brønsted acid while being in contact with the unmodified clay, the unmodified polymer or both.

For use in the process of preparing the nanocomposites of the present invention the layered clay is suspended in water to form the aqueous clay slurry. Preferably, the concentration of clay in water is sufficiently low to minimize the interaction between the clay particles and to increase exfoliation of the clay. In one embodiment, the aqueous slurry of clay can have a clay concentration of between 0.1 and 5.0 weight % and preferably between 0.1 and 3.0 weight %, based on the total weight of the slurry.

In certain embodiments, the pH of the aqueous slurry of clay to be used in the processes of the present invention can be acidic, neutral, or basic. In one embodiment, the pH of the aqueous slurry of clay can be between 4 and 13. The aqueous slurry of clay and water can be prepared by stirring clay and water at room temperature for a time sufficient to exfoliate the clay, e.g. for 0.25 to 24 hours, preferably for 4 to 16 hours, more preferably for 10 to 14 hours.

The amount of (exfoliated) clay incorporated in the nanocomposites in accordance with this invention is sufficient to develop an improvement in the mechanical properties and/or barrier properties of the nanocomposite, for example, tensile strength and/or air barrier properties. Amounts of clay in the nanocomposite of the invention generally range from 0.1 to 20 weight %, preferably from 0.2 to 15 weight %, more preferably from 0.5 to 10 weight %, and most preferably from 1 to 6 weight % based on the rubber content of the nanocomposite. Independently thereof, expressed in parts per hundred rubber, the clay or exfoliated clay may be present from 1 to 45 phr in one embodiment, from 2 to 20 phr in another embodiment, and from 3 to 11 phr in another embodiment.

Secondary Rubber Component

In addition to the polymer described above, preferably the halogenated elastomer, a secondary rubber or "general purpose rubber" component may be present in compositions and end use articles of the present invention. These rubbers include, but are not limited to, natural rubbers, polyisoprene rubber, poly(styrene-co-butadiene) rubber (SBR), polybutadiene rubber (BR), poly(isoprene-co-butadiene) rubber (IBR), styrene-isoprene-butadiene rubber (SIBR), ethylene-propylene rubber (EPM), ethylene-propylene-diene rubber (EPDM), polysulfide, nitrile rubber, propylene oxide polymers, star-branched butyl rubber and halogenated star-branched butyl rubber, brominated butyl rubber, chlorinated butyl rubber, poly(isobutylene-co-p-methylstyrene) and halogenated poly(isobutylene-co-p-methylstyrene), such as, for example, terpolymers of isobutylene derived units, p-methylstyrene derived units, and p-bromomethylstyrene derived units, and mixtures thereof.

Examples of the natural rubbers useful as secondary rubbers in the present invention are Malaysian rubbers such as SMR CV, SMR 5, SMR 10, SMR 20, and SMR 50 and mixtures thereof.

Some commercial examples of BR rubbers useful as secondary rubbers in the present invention are NATSYN™ (Goodyear Chemical Company), and BUDENE™ 1207 or BR 1207 (Goodyear Chemical Company). A desirable rubber is high cis-polybutadiene (cis-BR). By "high cis-polybutadiene", it is meant that 1,4-cis polybutadiene is used, wherein the amount of cis component is at least 95%.

Suitable EPM and EPDM rubbers are commercially available under the VISTALON™ tradename (ExxonMobil Chemical Company, Houston Tex.). Suitable comonomers in such EPDM's are ethylidene norbornene, 1,4-hexadiene, and dicyclopentadiene.

Finally, a so called semi-crystalline copolymer ("SCC") may also be present as the secondary "rubber" component. Generally, the SCC is a thermoplastic copolymer of ethylene, propylene and/or 1-butene derived units and optionally other $C_4$ to $C_{16}$ α-olefin or styrene derived units, wherein the SCC has some degree of crystallinity, characterized for example by a heat of fusion from 9 to 50 J/g, preferably from 15 to 25 J/g, as determined by DSC.

If a secondary rubber component is present in the elastomer composition of the invention in addition to the primary polymer, preferably the halogenated elastomer as described above, it is present in up to 90 phr, preferably in up to 70 phr, more preferably in up to 50 phr, more preferably in up to 40 phr and even more preferably in up to 30 phr based on the total rubber content. The minimum amount of secondary rubber component, if present, is 2 phr, preferably 5 phr, and more preferably 10 phr. A desirable embodiment may also include any combination of any upper phr limit and any lower phr limit.

Fillers, Additives, and Curatives

Nanocomposite compositions of the invention may also include one or more filler components such as calcium carbonate, clay, mica, silica and silicates, talc, titanium dioxide, and carbon black. As used herein, the term "filler" does not include clay particles forming part of the nanocomposite matrix as explained above, e.g. clay particles having a dimension in the nanometer range. However, larger clay particles can be used as a filler in the nanocomposites, if desired. In one embodiment, the filler is carbon black or modified carbon black. A preferred filler is semi-reinforcing grade carbon black present at a level of from 10 to 150 phr, more preferably from 30 to 120 phr. Useful grades of carbon black range from N110 to N990. Embodiments of carbon black useful in, for example, tire treads are N229, N351, N339, N220, N234 and N110 provided in ASTM D3037, D1510, and D3765. Carbon black grades useful in tire sidewalls are for example N330, N351, N550, N650, N660, and N762. Carbon black grades useful in tire innerliners are for example N550, N650, N660, N762, and N990.

Nanocomposite compositions of this invention may optionally include curative systems which are capable of curing the functionalized elastomeric copolymer component to provide vulcanizable compositions. Suitable curative systems are known in the art and include organic peroxides, zinc oxide in combination with zinc stearate or stearic acid and, optionally, one or more of the following accelerators or vulcanizing agents: Permalux (di-ortho-tolylguanidine salt of dicatechol borate), HVA-2 (m-phenylenebismaleimide), Zisnet (2,4,6-trimercapto-5-triazine), ZDEDC (zinc diethyl dithiocarbamate) and other dithiocarbamates, Tetrone A (dipenta-methylene thiuram hexasulfide), Vultac-5 (alkylated phenol disulfide), SP1045 (phenol formaldehyde resin), SP1056 (brominated alkyl phenol formaldehyde resin), DPPD (diphenyl phenylene diamine), salicyclic acid (o-hydroxy benzoic acid), wood rosin (abietic acid), and TMTDS (tetramethyl thiuram disulfide) in combination with sulfur. The composition may also be cured using ultraviolet light or electron irradiation.

Nanocomposite compositions of this invention may also include processing additives, such as processing or extender oils or other processing aids. Processing aids may be low molecular (less than 15,000 Mn) olefin homo- or copolymers, the olefin having from 3 to 8, preferably from 4 to 6 carbon atoms, and more preferably polybutenes. Commercial examples are the PARAPOL™ series of processing oils (ExxonMobil Chemical Company, Houston, Tex.), such as PARAPOL™ 450, 700, 950, 1300, 2400 and 2500. The compositions of this invention may also include one or more other polyalphaolefins or isoparaffins as non-functionalized plasticizers.

Nanocomposite compositions of the invention may also contain other conventional additives such as dyes, pigments, antioxidants, heat and light stabilizers, plasticizers, oils and other ingredients as known in the art.

Blending of the fillers, additives, curative components and other components, if used, may be carried out by combining the desired components and the nanocomposite of the present invention in any suitable mixing device such as a Banbury™ mixer, Brabender™ mixer or preferably a mixer/extruder and mixing at temperatures in the range of 120° C. up to 300° C. under conditions of shear sufficient to allow the components to become uniformly dispersed within the nanocomposite composition.

Process of Preparing the Nanocomposite

As mentioned above and in the claims, the present invention in its first aspect relates to a process of preparing a nanocomposite, the process comprising the steps of:
(a) contacting (i) a solution of a polymer in an organic solvent, (ii) an aqueous slurry of a clay, (iii) a modifier, and (iv) a Brønsted acid to form an emulsion;
(b) mixing the emulsion to form the nanocomposite; and
(c) recovering the nanocomposite from the emulsion. The polymer, the organic solvent, the clay, the modifier and the Brønsted acid are as defined hereinabove.

In step (a), the solution of the polymer in the organic solvent (i) is prepared or provided as explained above. Independently, the aqueous slurry of clay (ii) is prepared or provided as explained above.

The polymer solution (i) and the aqueous clay slurry (ii) are contacted with the modifier (iii), as described above, and the Brønsted acid (iv), as also described above. By contacting (and mixing) the polymer solution, the clay slurry, the modifier and the Brønsted acid an emulsion is formed. In certain embodiments, the volume ratio of the aqueous slurry of clay to the polymer solution in the emulsion can be from 0.01:1 to 1:1; preferably from 0.1:1 to 0.9:1, and most preferably from 0.3:1 to 0.7:1.

The emulsions in the present invention are formed by conventional emulsion technology. The combined polymer solution (in an organic solvent), the aqueous clay slurry, and the modifier which is protonated in situ by the Brønsted acid (and thus serves as a surfactant), are subjected to sufficient shearing, as in a commercial blender or its equivalent for a period of time sufficient for forming the emulsion, e.g., at least a few seconds and preferably a few minutes. The emulsion can be allowed to remain in emulsion form, with or without continuous or intermittent mixing or agitation, with or without heating or other temperature control, for a period sufficient to enhance exfoliation of the clay, e.g. from 0.1 to 100 hours, preferably from 0.1 to 50 hours, and more preferably from 0.5 to 20 hours.

Preferably, a high-shear mixer is used to mix the components of the emulsion in order to form the nanocomposites. For example, without limitation, a Silverson High Shear Mixer L4RT-W (Batch) or (In-line) may be used.

The amount of modifier (e.g. PIB-amine) used may be at least 0.001 weight % of the total emulsion containing the organic solvent, the polymer, the aqueous clay slurry, the modifier and the Brønsted acid, more preferably 0.001 to 3 weight %, and most preferably 0.01 to 2 weight % thereof.

The amount of Brønsted acid should be (on a molar basis) at least equal to the amount of the (unprotonated) modifier. Preferably, the (molar) amount of Brønsted acid should exceed the (molar) amount of the (unprotonated) modifier as disclosed above.

The polymer solution (i), the aqueous clay slurry (ii), the modifier (iii) and the Brønsted acid (iv) can be combined in different orders. In a preferred embodiment, in step (a) of the process according to the first aspect of the present invention a first mixture comprising the polymer solution and the Brønsted acid, and a second mixture comprising the aqueous clay slurry and the modifier are provided, and the first and the second mixture are then combined to form the emulsion. In this embodiment, the first mixture is preferably the effluent of a polymer halogenation reactor, in which reactor the polymer (in an organic solvent) has been reacted under halogenation conditions generally known in the art with a halogen, preferably chlorine or bromine. The effluent of this reactor is a solution comprising the halogenated polymer and the hydrogen halide, which serves as the Brønsted acid (hydrogen bromide or hydrogen chloride, as the case may be). The solution of the halogenated polymer is also called "cement". This effluent from the halogenation reaction can be used without any further work-up or separation processes and can be combined with the aqueous clay slurry and the modifier so that the modifier is protonated "in situ" by the hydrogen halide. No additional Brønsted acid is needed in this case, and the acid present in the halogenation reactor effluent does not need to be neutralized. The modifier (which may be dissolved or diluted in a suitable solvent or diluent, preferably the same solvent or solvent mixture in which the halogenated polymer is dissolved) may be added to the first mixture comprising the polymer solution and the hydrogen halide, and then the clay slurry may be added. Alternatively, the clay slurry may be added to said first mixture prior to the addition of the modifier. Further alternatively, the modifier (which may be dissolved or diluted in a suitable solvent or diluent) and the clay slurry may be pre-combined, thereby forming the second mixture mentioned above, and then contacted with the first mixture containing the polymer solution and the hydrogen halide.

In another embodiment, if the preparation of the nanocomposite is not integrated with a polymer halogenation process, in step (a) of the process according to the first aspect of the present invention the solution of the polymer in the organic solvent is first combined with the aqueous slurry of clay, and then the modifier and the Brønsted acid, either separately or jointly, are added to the polymer solution/clay slurry mixture. In one embodiment, the unprotonated modifier and the Brønsted acid can be pre-combined, resulting in the protonated modifier which may or may not be isolated prior to contacting it with the polymer solution and/or the aqueous clay slurry. Alternatively, a quaternary ammonium salt may be used as the modifier, without the need to add a Brønsted acid.

In step (c) of the process of the first aspect of the present invention, the nanocomposite is recovered by means of, for example, precipitating the nanocomposite from solution and recovering the precipitated nanocomposite from the liquid by filtering and drying the recovered nanocomposite. Alternatively, any liquids (in particular the organic solvent) can be evaporated, such as by steam stripping, and the resulting slurry passed through a series of drying steps or extruders to dry the nanocomposite.

The present invention also relates to the use of a modifier as defined above, preferably an amine of the formula $NR_3$, wherein the groups R are identical or different and, independently of each other, are a hydrogen atom, an alkyl group having at least 5 and up to 100 carbon atoms, an aryl group having from 5 to 25 carbon atoms, an alkylaryl group having from 5 to 50 carbon atoms, an arylalkyl group having from 5 to 50 carbon atoms, or an ether group having at least 5 and up to 100 carbon atoms, with the proviso that at least one group R is not a hydrogen atom, as an emulsifier in the preparation of polymer/clay nanocomposites. This preparation of polymer/clay nanocomposites comprises the contacting, in the presence of a Bronsted acid, of a solution of a polymer in an organic solvent with an aqueous slurry of a clay. The polymer, the organic solvent, the clay, the modifier etc. are all as already defined in more detail above. Again, the modifier is preferably protonated in situ by the Brønsted acid.

Process for Halogenating a Polymer (and Preparing a Nanocomposite)

As mentioned above and in the claims, the present invention in a second aspect relates to a process for halogenating a polymer, the process comprising the steps of:
(a) providing a solution of the polymer in an organic solvent,
(b) contacting said polymer solution with a halogen in a reactor under halogenation conditions to form halogenated polymer and hydrogen halide,
(c) contacting the effluent stream of the halogenation reactor of step (b) comprising halogenated polymer and hydrogen halide with an aqueous slurry of a clay and with a modifier to form an emulsion, and
(d) mixing the emulsion to form a nanocomposite of halogenated polymer and clay, and
(e) recovering the nanocomposite from the emulsion.

In this embodiment the process of preparing the nanocomposite is an integral part of the process of halogenating a polymer. Put differently, this second aspect of the present invention relates to a process of halogenating a polymer (the halogenation itself being known in the art), characterized in that the effluent (the "cement", as explained above) of that the halogenation reactor, which contains the halogenated polymer in a solvent or solvent mixture and the hydrogen halide (HCl or HBr), is used immediately, i.e., essentially without further separation and without neutralization of the acid, for the preparation of the nanocomposite. The hydrogen halide in the effluent stream thus serves as the Brønsted acid in accordance with the present invention. The effluent stream from the halogenation reactor is combined in step (c) with the aqueous clay slurry and, either separately or jointly, with the modifier in the same manner as described above with respect to the first aspect of the present invention. The modifier is thereby protonated in situ by the Brønsted acid. The resulting emulsion is mixed in step (d) in order to form the nanocomposite in the same way as described above. Also, the recovery of the nanocomposite in step (e) is performed as explained above with respect to the first aspect of the present invention.

Advantages of the Processes of the Present Invention

With the processes of the present invention the preparation of polymer/clay nanocomposites can be improved. Due to the use of a modifier that is not pre-bound (via covalent or ionic bonds) to the polymer or to the clay, and due to the fact that the modifier has a relatively low molecular weight (compared to the polymer and the bulk clay), the interaction between the polymer in the organic phase and the clay in the aqueous phase via the modifier (which is protonated in situ) is improved. The exfoliation of the clay in the polymer matrix is enhanced, which has a positive effect on the air retention capability of the resulting nanocomposite and of compositions and articles made thereof. The nanocomposites prepared according to the present invention have improved air retention properties, while maintaining good processability and mechanical performance.

Furthermore, in the processes of the present invention agglomeration of the clay during the formation of the emulsion and the formation of the nanocomposite is reduced or avoided. Also, the clay retention rate is better than in previous processes due to the improved interaction between the clay and the polymer. In other words, the exfoliated clay is better retained in the polymer matrix. This is advantageous because less clay material is lost during the production of the nanocomposite.

Finally, if the process of the present invention is performed as an integrated process with the halogenation of a polymer, preferably in the case of a halogenated isobutylene-based elastomer, using the effluent (the cement) from the halogenation reactor (which effluent contains the halogenated polymer in solution, together with the hydrogen halide which serves as the Brønsted acid) and combining it with the aqueous clay slurry and, separately or jointly, with the modifier, this in-situ protonation process may eliminate or at least reduce the need for additional process steps, such as the neutralization of the formed hydrogen halide, and/or separation of the halogenated polymer, and thus makes the combined process more time- and cost-efficient.

Industrial Applicability of the Nanocomposites

The nanocomposites of this invention and the compositions comprising the nanocomposites prepared by any of the processes of the present invention described above may be shaped into the desired form, for example extruded, compression molded, blow molded, injection molded or lamination molded into various shaped articles including fibers, films, laminates, layers, industrial parts such as automotive parts, appliance housings, consumer products, packaging and the like. In particular, the elastomeric compositions are useful in articles for a variety of tire applications such as truck tires, bus tires, automobile tires, motorcycle tires, off-road tires, aircraft tires, and the like. The elastomeric compositions may either be fabricated into a finished article or a component of a finished article such as an innerliner for a tire. The article may be selected from air barriers, air membranes, films, innerliners, innertubes, sidewalls, treads, bladders, and the like. In another application, the elastomeric compositions may be employed in air cushions, pneumatic springs, air bellows, hoses, accumulator bags, and belts such as conveyor belts or automotive belts. They are also useful in molded rubber parts and find wide applications in automobile suspension bumpers, auto exhaust hangers, and body mounts.

The compositions comprising the nanocomposites of the present invention made by a process involving the in-situ protonation of a modifier such as the PIB-amine have improved air barrier properties (lower oxygen permeability) than compositions made with a prior art process using either a functionalized elastomer or an organo-modified clay. The compositions may also have a high impact strength.

The air permeability of the compositions comprising a cured nanocomposite prepared by the processes of the present invention determined as the oxygen transmission rate at 40° C. is 120 mm cm$^3$/(m$^2$ day) or lower, preferably 110 mm cm$^3$/(m$^2$ day) or lower, preferably 100 mm cm$^3$/(m$^2$ day) or lower, preferably 90 mm cm$^3$/(m$^2$ day) or even lower. The nanocomposites made according to the present invention involving the in-situ protonation of a modifier can have a reduction of up to 20% in air permeability compared to nanocomposites made according to prior art processes involving the use of either pre-functionalized polymer or organo-modified clay, and an even higher reduction in air permeability is achieved when compared to prior art processes that do not use a clay or polymer modifier or exfoliating aid at all.

Furthermore, in the nanocomposites of the present invention the exfoliation of the clay and the clay-polymer interaction is improved. The clay particles or platelets are uniformly dispersed within the polymer matrix. By "uniformly dispersed" it is meant that the particles are not agglomerated, preferably that at least 80%, more preferably at least 90%, preferably at least 95%, most preferably 100% of the particles are surrounded by polymer as shown on transmission electron microscopy (TEM). Also, the clay retention is improved in the nanocomposites of the present invention as compared to prior art processes.

In alternate embodiment, this invention relates to:
1. A process of preparing a nanocomposite of a polymer and a clay, comprising the steps of:
   (a) contacting (i) a solution of a polymer in an organic solvent, (ii) an aqueous slurry of a clay, (iii) a modifier, and (iv) a Brønsted acid to form an emulsion;
   (b) mixing the emulsion to form the nanocomposite; and
   (c) recovering the nanocomposite from the emulsion.
2. The process of subparagraph 1, wherein the modifier is protonated in situ by the Brønsted acid.
3. The process of subparagraphs 1 or 2, wherein in step (a) a first mixture comprising the polymer solution and the Brønsted acid, and a second mixture comprising the aqueous clay slurry and the modifier are provided, and the first and the second mixture are combined to form the emulsion.
4. The process of subparagraph 3, wherein the first mixture is the effluent of a polymer halogenation reactor.
5. The process of any of the preceding subparagraphs, wherein in step (a) the polymer solution and the clay slurry are first combined to form an emulsion, and the modifier and the Brønsted acid are added, either separately or jointly, to said emulsion.
6. The process of any of the preceding subparagraphs, wherein the polymer is a halogenated elastomer, preferably a halogenated $C_4$ to $C_7$ isoolefin-based interpolymer additionally comprising multiolefin and/or alkylstyrene units.
7. The process of any of the preceding subparagraphs, wherein the polymer is a brominated interpolymer comprising isobutylene and para-methylstyrene units, wherein the paramethylstyrene units are present in 3 to 15 weight %, based on the total interpolymer weight, and 0.4 to 5 mol % of the paramethylstyrene units are brominated paramethylstyrene units.
8. The process of any of the preceding subparagraphs, wherein the organic solvent is one or more linear, branched or cyclic alkane(s) having from 2 to 40, preferably from 4 to 15 carbon atoms.
9. The process of any of the preceding subparagraphs wherein the clay is a swellable layered clay which comprises platelets having a thickness of from 5 to 20 Å.
10. The process of any of the preceding subparagraphs, wherein the clay is an inorganic clay which has not been organically modified by means of replacement of the inorganic cations by organic cations.
11. The process of any of the preceding subparagraphs, wherein the clay comprises smectic clay and preferably is montmorillonite, nontronite, beidellite, bentonite, volkonskoite, laponite, hectorite, saponite, sauconite, magadite, kenyaite, stevensite, vermiculite, halloysite, hydrotalcite, or any combination thereof
12. The process of any of the preceding subparagraphs, wherein the modifier is or contains an amine of the formula $NR_3$, wherein the groups R are identical or different and, independently of each other, are a hydrogen atom, an alkyl group having at least 5 and up to 100 carbon atoms, an aryl group having from 5 to 25 carbon atoms, an alkylaryl group having from 5 to 50 carbon atoms, an arylalkyl group having from 5 to 50 carbon atoms, or an ether group having at least 5 and up to 100 carbon atoms, with the proviso that at least one group R is not a hydrogen atom; and preferably the modifier is or contains an amine of the formula $NRH_2$ wherein R is an alkylaryl group having from 10 to 25 carbon atoms or an alkyl group having at least 40 carbon atoms.
13. The process of subparagraph 12, wherein the modifier is a combination of an amine as defined in subparagraph 12 and an ammonium salt of the formula $NR_4^+C^-$, wherein R is as defined in subparagraph 12 and $X^-$ is halogenide, preferable chloride or bromide.
14. The process of any of the preceding subparagraphs, wherein the modifier is or contains polyisobutene-amine (PIB-amine) or 4-tetradecyl aniline.
15. The process of any of the preceding subparagraphs, wherein the Brønsted acid is a hydrogen halide, preferably hydrogen bromide or hydrogen chloride.
16. The process of any of the preceding subparagraphs, wherein in step (c) the recovery of the nanocomposite comprises precipitating the nanocomposite, filtering and/or evaporation of the liquid.
17. The process of any of the preceding subparagraphs, wherein the modifier is used in an amount of 5 to 60% of the maximum molar cationic exchange ratio of the total weight of the clay added, and/or the Brønsted acid is used in an amount of 100 to 200% of one molar equivalent of the modifier.

18. A process for halogenating a polymer, the process comprising the steps of:
  (a) providing a solution of the polymer in an organic solvent,
  (b) contacting said polymer solution with halogen in a reactor under halogenation conditions to form halogenated polymer and hydrogen halide,
  (c) contacting the effluent stream of the halogenation reactor of step (b) comprising halogenated polymer and hydrogen halide with an aqueous slurry of a clay and with a modifier to form an emulsion,
  (d) mixing the emulsion to form a nanocomposite of halogenated polymer and clay, and
  (e) recovering the nanocomposite from the emulsion.
19. The process of the preceding subparagraph, wherein the organic solvent, the halogenated polymer, the clay, the modifier and the process steps are as defined in any of subparagraphs 2 to 17.
20. A nanocomposite comprising a polymer and a clay, prepared by the process of any of the preceding subparagraphs.
21. A composition comprising the nanocomposite of the preceding subparagraph and optionally one or more components selected from the group consisting of secondary rubbers, fillers, curative systems, processing aids, stabilizers, antioxidants and pigments.
22. The composition of the preceding subparagraph, wherein the nanocomposite is cured and has an air permeability characterized by an oxygen transmission rate at 40° C. of 110 mm cm$^3$/(m$^2$ day) or less, preferably of 100 mm cm$^3$/(m$^2$ day) or less, most preferably of 90 mm cm$^3$/(m$^2$ day) or less.
23. An article comprising the composition of subparagraphs 21 or 22.
24. The article of the preceding subparagraph, wherein the article is a film, membrane, bladder, tire, tire innerliner, tire innertube, tire sidewall, or tire tread.
25. The use of an amine of the formula NR$_3$, wherein the groups R are identical or different and, independently of each other, are a hydrogen atom, an alkyl group having at least 5 and up to 100 carbon atoms, an aryl group having from 5 to 25 carbon atoms, an alkylaryl group having from 5 to 50 carbon atoms, an arylalkyl group having from 5 to 50 carbon atoms, or an ether group having at least 5 and up to 100 carbon atoms, with the proviso that at least one group R is not a hydrogen atom, as an emulsifier in the preparation of polymer/clay nanocomposites.

The following examples reflect embodiments of this disclosure and are by no means intended to be limiting of the scope of this disclosure.

EXAMPLES

Permeability Testing

For each of the following examples, the nanocomposites formed were analyzed for permeability properties using the following method. In certain embodiments, 36 grams of the nanocomposite material were loaded into a Brabender® mixer at a temperature of 130-145° C. and mixed with 20 grams of carbon black (N660) for 7 minutes. The mixture was further mixed with a curatives package of 0.33 g stearic acid, 0.33 g of ZnO (Kadox 911 obtained from CP Hall, Chicago, Ill.), and 0.33 g MBTS (mercaptobenzothiazole-disulfide) at 40° C. and 40 rpm for 3 minutes. The resulting material was milled, compression molded and cured at 170° C. All specimens were compression molded with slow cooling to provide defect-free pads. A compression and curing press was used for rubber samples. Typical thickness of a compression molded pad was around 15 mil (381 μm). Using an Arbor press, 2-in. (5 cm) diameter disks were then punched out from molded pads for permeability testing. These disks were conditioned in a vacuum oven at 60° C. overnight prior to the measurement. The oxygen permeation measurements were done using a Mocon OX-TRAN 2/61 permeability tester at 40° C. under the principle of R. A. Pasternak et al. in: Journal of Polymer Science: Part A-2, Vol 8, 467 (1970). Disks thus prepared were mounted on a template and sealed with vacuum grease. Ten psig (0.07 MPa(g)) nitrogen was kept on one side of the disk, whereas the other side was 10 psig (0.07 MPa(g)) oxygen. Using the oxygen sensor on the nitrogen side, the increase in oxygen concentration was monitored over time. The time required for oxygen to permeate through the disk, or for oxygen concentration on the nitrogen side to reach a constant value, was recorded and used to determine the oxygen permeability. Permeability is given as the oxygen transmission rate on a Mocon WX-TRAN 2/61 at 40° C. in mm cm$^3$/(m$^2$ day).

Mooney Viscosity Measurement

The Mooney viscosity was determined for the polymers and the compositions of the present invention in accordance with ASTM D-1646.

Clay Content Measurement

The clay content in the nanocomposites was measured by a PerkinElmer Pyris 1 TGA instrument. A sample (~10 mg) was heated to 800° C. at a rate of 20° C./min. The clay content (%) was calculated by subtracting the polymer ash content (%) from the nanocomposite sample residue (%) at 600° C.

Interfacial Tension Measurement

Oil/water interfacial tensions were measured using the well known pendant drop interfacial tension method. A Rame Hart pendant drop interfacial tensiometer was used.

Droplet Size Measurement

Droplet sizes were measured by optical microscopy. A LASENTEC particle video monitor (PVM) was used for the measurements. In this method, the LASENTEC PVM apparatus, a LCD camera attached to the probe is directly introduced into the emulsion and video frames are captured to provide individual micrographs. The micrographs with the associated size scale provide a measure of droplet sizes.

TABLE 1

(Material Description for Abbreviations used in Examples):

| Designation | Description | Material/Supplier |
|---|---|---|
| Exxpro ™ 3745 | Brominated isobutylene/para-methylstyrene rubber (7.5 wt. % PMS, 1.2 mol % Br) | ExxonMobil Chemical Company (Houston, TX) |
| Exxpro ™ 3433 | Brominated isobutylene/para-methylstyrene rubber (5 wt. % PMS, 0.75 mol % Br) | ExxonMobil Chemical Company (Houston, TX) |

TABLE 1-continued (Material Description for Abbreviations used in Examples):

| Designation | Description | Material/Supplier |
|---|---|---|
| MDX 03-1 | Brominated isobutylene/para-methylstyrene rubber (10 wt. % PMS, 0.8 mol % Br) | ExxonMobil Chemical Company (Houston, TX) |
| Bromobutyl 2222 | Brominated isobutylene-isoprene rubber (2.0 wt % Br, Mooney Viscosity 32) | ExxonMobil Chemical Company (Houston, TX) |
| Bromobotyl 2255 | Brominated isobutylene-isoprene/rubber (2.0 wt % Br, Mooney Viscosity 46) | ExxonMobil Chemical Company (Houston, TX) |
| PIB-amine solution | Polyisobutylene amine solution | KEROCOM PIBA 03 (65% of PIB-amine (MW~970 g/mol) in paraffinic oil); BASF |
| 4-tetradecyl-aniline | Solid | Aldrich |
| Na$^+$ | Un-modified (natural) Montmorillonite clay with Na$^+$ counter ions | CLOISITE ® Na$^+$; Southern Clay Products, Inc. |
| Na$^+$ Slurry | Aqueous slurry of Montmorillonite clay with Na$^+$ counter ions | CLOISITE ® Na$^+$, 2.83 wt % slurry; Southern Clay Products, Inc. |

PMS = para-methylstyrene

Examples 1 to 8

MDX 03-1 polymer or polymer cement (see Table 2 below) was dissolved or diluted in iso-hexane (see also Table 2 below). Hydrobromic acid, HBr (48% aqueous solution, Aldrich, see Table 2) was added. 214 g of aqueous slurry of sodium montmorillonite clay (see Table 1) was diluted with 200 mL of deionized water and mixed with PIB-amine solution (as explained in Table 1; for the amounts see Table 2 below) and 50 mL of iso-hexane using a high-shear mixer (Silverson L4RT-W, at 6000 RPM). The resulting emulsion was mixed with acidified polymer solution using the Silverson L4RT-W high-shear mixer at 6000 RPM for 40 minutes. The product was obtained by steam stripping to remove the solvents, and dried in a vacuum oven at 105° C. for 16 hours.

TABLE 2

(compositions of Examples 1 to 8):

| | Ex. No. | | | | | | | |
|---|---|---|---|---|---|---|---|---|
| | 1 | 2 | 3 | 4 | 5 | 6 | 7 | 8 |
| MDX 03-1 polymer | 100 | 100 | 100 | 100 | | | | |
| MDX 03-1 polymer cement | | | | | 455 | 455 | 455 | 455 |
| iso-hexane (mL) | 1000 | 1000 | 1000 | 1000 | 600 | 600 | 600 | 600 |
| HBr (mL) | 1.54 | 1.54 | 2.46 | 2.46 | 1.54 | 1.54 | 2.46 | 2.46 |
| PIB-amine solution (mL) | 2.7 | 5.4 | 2.7 | 5.5 | 2.7 | 5.5 | 2.7 | 5.5 |

MDX 03-1 polymer cement: 22 wt % MDX 03-1 from ExxonMobil butyl plant in Baytown, TX Clay Retention Measurement and Mooney Viscosity of Examples 1 to 8

Inorganic content was measured in a PerkinElmer Pyris 1 TGA instrument as described above. The results as well as the Mooney viscosities are shown in Table 3 below:

TABLE 3

(Clay Retention and Mooney Viscosity of Examples 1 to 8):

| Example | Clay Content (phr) | Clay Retention (%) | Mooney Viscosity |
|---|---|---|---|
| Example 1 | 5.19 | 86.56 | 35.3 |
| Example 2 | 4.53 | 75.49 | 31.5 |
| Example 3 | 5.32 | 88.70 | 24.8 |
| Example 4 | 4.44 | 73.98 | 27.1 |
| Example 5 | 5.00 | 83.27 | 53.7 |
| Example 6 | 5.06 | 84.38 | (not determ.) |
| Example 7 | 5.65 | 94.11 | 41.4 |
| Example 8 | 4.73 | 78.84 | 51.4 |

Permeability Measurement of Examples 1-8

Polymer nanocomposites were mixed with carbon black and curatives as described above in a Brabender mixer at 130-145° C. The rubber compounds were compression molded and cured at 170° C. Permeability was measured as oxygen transmission rate on Mocon OX-TRAN 2/61 at 40° C. as described above. The results are provided in Table 4 below.

TABLE 4

(Permeation Rate of Examples 1 to 8):

| Example | Permeation Rate (mm cm$^3$/(m$^2$ day), 40° C.) |
|---|---|
| Example 1 | 92.94 |
| Example 2 | 90.00 |
| Example 3 | 91.99 |
| Example 4 | 88.84 |
| Example 5 | 88.70 |
| Example 6 | 82.76 |
| Example 7 | 88.38 |
| Example 8 | 89.12 |

Examples 9 to 18

Polymer (see Table 5 below) was dissolved in 1000 mL iso-hexane. 2.05 mL of hydrobromic acid, HBr (48% aqueous solution, Aldrich) was added. 214 g of aqueous slurry of sodium montmorillonite clay (see Table 1 above) was diluted with 200 mL of deionized water and mixed with PIB-amine solution (as explained in Table 1; for the amounts see Table 5 below) and 50 mL of iso-hexane using a high-shear mixer (Silverson L4RT-W, at 6000 RPM). The resulting emulsion was mixed with acidified polymer solution using the Silverson L4RT-W high-shear mixer at 6000 RPM for 40 minutes. The product was obtained by steam stripping to remove the solvents, and dried in a vacuum oven at 105° C. for 16 hours.

TABLE 5

(Compositions of Examples 9 to 18):

| | Ex. No. | | | | | | | | | |
|---|---|---|---|---|---|---|---|---|---|---|
| | 9 | 10 | 11 | 12 | 13 | 14 | 15 | 16 | 17 | 18 |
| Exxpro ™ 3745 (g) | 100 | 100 | | | | | | | | |
| Exxpro ™ 3433 (g) | | | 100 | 100 | | | | | | |
| BB 2222 (g) | | | | | 100 | 100 | 100 | | | |
| BB 2255 (g) | | | | | | | | 100 | 100 | 100 |
| PIB-amine solution (mL) | 2.2 | 4.4 | 2.2 | 5.5 | 1.1 | 2.2 | 5.5 | 1.1 | 2.2 | 5.5 |

Clay Retention Measurement and Mooney Viscosity of Examples 9-18

Inorganic content was measured in a PerkinElmer Pyris 1 TGA instrument as described above. The results as well as the Mooney viscosities of the samples are summarized in Table 6 below:

TABLE 6

(Clay Retention and Mooney Viscosity of Examples 9 to 18):

| Example | Clay Content (phr) | Clay Retention (%) | Mooney viscosity |
|---|---|---|---|
| Example 9 | 5.33 | 88.86 | 65.9 |
| Example 10 | 5.60 | 93.42 | 62.9 |
| Example 11 | 5.43 | 90.51 | 46.7 |
| Example 12 | 5.02 | 83.60 | 64.4 |
| Example 13 | 4.06 | 67.64 | 33.7 |
| Example 14 | 5.08 | 84.69 | 67.1 |
| Example 15 | 5.20 | 86.62 | 33.1 |
| Example 16 | 4.34 | 72.38 | 56.5 |
| Example 17 | 5.59 | 93.15 | 75.4 |
| Example 18 | 5.50 | 91.59 | 57.8 |

Permeability Measurement of Examples 9-18

Polymer nanocomposites were mixed with carbon black and curatives as described above in a Brabender mixer at 130-145° C. The rubber compounds were compression molded and cured at 170° C. Permeability was measured as oxygen transmission rate on Mocon OX-TRAN 2/61 at 40° C. as described above. The results are summarized below in Table 7.

TABLE 7

(Permeation Rate of Examples 9 to 18):

| Example | Permeation Rate (mm cm$^3$/(m$^2$ day), 40° C.) |
|---|---|
| Example 9 | 91.22 |
| Example 10 | 87.05 |
| Example 11 | 95.44 |
| Example 12 | 97.65 |
| Example 13 | 112.99 |
| Example 14 | 95.59 |
| Example 15 | 103.37 |
| Example 16 | 110.02 |
| Example 17 | 97.37 |
| Example 18 | 106.76 |

Comparative Examples 19 to 22

Polymer (as specified in Table 8 below) was dissolved in 1000 mL of iso-hexane. 214 g of aqueous slurry of sodium montmorillonite clay (see Table 1 above) was diluted with 200 mL of deionized water and mixed with the polymer solution using a high-shear mixer (Silverson L4RT-W, at 6000 RPM) for 40 minutes. No PIB-amine and acid were added. The product was obtained by steam stripping to remove the solvents, and dried in a vacuum oven at 105° C. for 16 hours.

TABLE 8

(Compositions of Comparative Examples 19 to 22):

| | Ex. No. | | | |
|---|---|---|---|---|
| | 19 | 20 | 21 | 22 |
| Exxpro ™ 3745 (g) | 100 | | | |
| Exxpro ™ 3433 (g) | | 100 | | |
| BB 2222 (g) | | | 100 | |
| BB 2255 (g) | | | | 100 |

Clay Retention Measurement and Mooney Viscosity of Comparative Examples 19-22

Inorganic content was measured in a PerkinElmer Pyris 1 TGA instrument as described above. The results as well as the Mooney viscosities of the samples are summarized in Table 9 below:

TABLE 9

(Clay Retention and Mooney Viscosity of Comparative Examples 19 to 22):

| Example | Clay Content (phr) | Clay Retention (%) | Mooney viscosity |
|---|---|---|---|
| Comparative Example 19 | 1.37 | 22.76 | 40.1 |
| Comparative Example 20 | 0.52 | 8.60 | 36.9 |
| Comparative Example 21 | 0.27 | 4.47 | 34.3 |
| Comparative Example 22 | 0.61 | 10.16 | 59.7 |

Permeability Measurement of Comparative Examples 19-22

Polymer nanocomposites were mixed with carbon black and curatives as described above in a Brabender mixer at 130-145° C. The rubber compounds were compression molded and cured at 170° C. Permeability was measured as oxygen transmission rate on Mocon OX-TRAN 2/61 at 40° C. as described above. The results are summarized in Table 10.

TABLE 10

(Permeation Rate of Comparative Examples 19 to 22):

| Example | Permeation Rate (mm cm$^3$/(m$^2$ day), 40° C.) |
|---|---|
| Comparative Example 19 | 108.97 |
| Comparative Example 20 | 116.22 |
| Comparative Example 21 | 123.52 |
| Comparative Example 22 | 123.49 |

Other comparative examples are the examples disclosed in WO 2008/045012, wherein the nanocomposites are prepared in a different way than in the present invention, namely by pre-functionalizing the polymer and then contacting the functionalized polymer with the clay slurry. The process disclosed therein does not involve the in situ protonation of a modifier with a Brønsted acid as in the processes of the present invention. The permeation rate of the examples according to the present invention is lower than for comparable examples disclosed in WO 2008/045012.

Example 23

Measurement of Interfacial Tension, IFT

Interfacial tension at the hexane-water interface (wherein the water contained 0.1M HBr) was measured as explained above. It was found that the hexane-water interface in the presence of a brominated isobutylene-paramethylstyrene copolymer MDX 03-01 (see Table 1 above) exhibits an interfacial tension corresponding to a toluene-water interface (see Table 11).

TABLE 11

(Interfacial Tension (IFT) Data of Example 23):

| Organic Phase/0.1M HBr in water | IFT (dynes/cm) |
|---|---|
| n-hexane | 64 |
| iso-hexane | 60 |
| Toluene | 32 |
| 0.1 wt. % MDX 03-01/iso-hexane | 31 |
| 0.01M PIB-amine/iso-hexane | 0.9 |
| 0.01M PIB-amine/0.1 wt. % MDX 03-01/iso-hexane | 1.8 |
| 0.01M 4-tetradecylaniline/iso-hexane | <0.1 |
| 0.01M 4-tetradecylaniline/0.1 wt. % MDX 03-01/iso-hexane | <0.1 |
| 0.01M PIB-amine/iso-hexane | 48 |
| 0.01M 4-tetradecylaniline/iso-hexane | 48 |

PIB-amine, 4-tetradecylamine and MDX 03-01: see Table 1 above

The above finding indicates that the halogenated isobutylene/paramethylstyrene copolymer molecules are surface-active and suggests that the polymer aggregates at the hexane-water interface such that the aromatic groups of the polymer position themselves at the hexane-water interface and the alkyl chain is solubilized in the hexane phase. A pictorial representation of this aggregation at the hexane-water interface is shown in FIG. 1.

Furthermore, it is evident from the above Table 11 that, in case the modifier according to the present invention contains any aromatic groups (such as in the case of 4-tetradecylaniline), these aromatic groups seem to interact with the aromatic groups of the isobutylene/paramethylstyrene copolymer, which leads to an even further reduction in interfacial tension.

Example 24

Measurement of Droplet Size of Dispersed Water Phase

Figure 2:
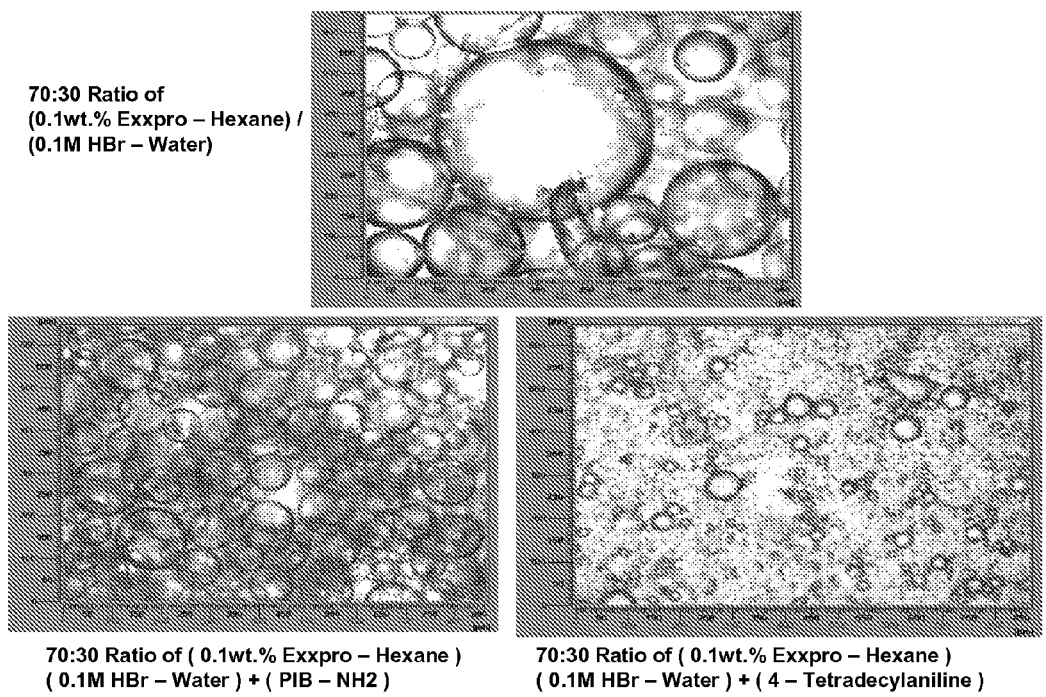
FIG. 2 shows the reduction in water droplet size achieved in emulsions containing polymer, solvent, water and a Brønsted acid in the presence of a modifier according to the present invention (two lower pictures) compared to emulsions wherein such modifier is absent (upper picture).

Water-in-hexane emulsions containing brominated isobutylene-paramethylstyrene copolymer MDX 03-01 (see Table 1 above) wherein the aqueous phase was 0.1M HBr, and the organic phase was isohexane were prepared as follows: To the isohexane solution of the polymer was added the aqueous phase containing HBr and the modifier (no clay was added in this example). As the aqueous phase was added to the hexane solution the mixture was mixed using a Silverson concentric rod and cylinder type mixer. The droplet sizes of the dispersed water phase were determined by in-situ video microscopy (Lasentec PVM) as explained above. Both PIB-amine and 4-tetradecyl aniline (see Table 1 above) were used individually as the modifier in this example. A significant reduction in water droplet size was found with both modifiers. The reduction of water droplet size was even more pronounced with 4-tetradecyl aniline. Micrographs of the emulsion samples are shown in FIG. 2. The upper picture shows a sample without the use of any modifier. The two lower pictures show samples which contain modifier according to the present invention (left picture: PIB-amine, right picture: 4-tetradecyl aniline). The observed emulsion properties, i.e., the sizes of the dispersed water droplets, are consistent with the observed interfacial tension data (see Example 23 above).

These results demonstrate that the modifiers according to the present invention, as defined above, serve as bi-functional modifiers that both help to emulsify the aqueous phase in the organic solvent, and that also increase exfoliation of the clay. The processes of the present invention, involving in-situ protonation of the modifier with a Brønsted acid, combine these advantageous properties of the modifiers with an improved and efficient way of preparing polymer/clay nanocomposites with good air retention properties.

All documents described herein are incorporated by reference herein for US patent practice, including any priority documents and/or testing procedures to the extent they are not inconsistent with this text. As is apparent from the foregoing general description, the specific embodiments and the examples, while forms of the invention have been illustrated and described, various modifications can be made without departing from the spirit and scope of the invention. Accordingly, it is not intended that the invention be limited thereby.

What is claimed is:

1. A process of preparing a nanocomposite of a polymer, a clay, and a modifier comprising the steps of:
   (a) contacting:
      (i) a solution of a polymer in an organic solvent,
      (ii) an aqueous slurry of a clay,
      (iii) a modifier, and
      (iv) a Brønsted acid
   to form an emulsion;
   (b) mixing the emulsion to form a nanocomposite; and
   (c) recovering the nanocomposite from the emulsion.

2. The process of claim 1, wherein the modifier is protonated in situ by the Brønsted acid.

3. The process of claim 1, wherein in step (a) a first mixture comprising the polymer solution and the Brønsted acid, and a second mixture comprising the aqueous clay slurry and the modifier are provided, and the first and the second mixture are combined to form the emulsion.

4. The process of claim 3, wherein the first mixture is the effluent of a polymer halogenation reactor.

5. The process of claim 1, wherein in step (a) the polymer solution and the clay slurry are first combined to form an emulsion, and the modifier and the Brønsted acid are added, either separately or jointly, to said emulsion.

6. The process of claim 1 wherein the polymer is an elastomer.

7. The process of claim 1, wherein the polymer is a halogenated elastomer comprising $C_4$ to $C_7$ isoolefin and multiolefin or alkylstyrene units.

8. The process of claim 1, wherein the organic solvent is one or more linear, branched or cyclic alkane(s) having from 4 to 15 carbon atoms.

9. The process of claim 1, wherein the clay is an inorganic clay which has not been organically modified by means of replacement of the inorganic cations by organic cations.

10. The process of claim 1, wherein the modifier is or contains an amine of the formula $NR_3$, wherein the groups R are identical or different and, independently of each other, are a hydrogen atom, an alkyl group having at least 5 and up to 100 carbon atoms, an aryl group having from 5 to 25 carbon atoms, an alkylaryl group having from 5 to 50 carbon atoms, an arylalkyl group having from 5 to 50 carbon atoms, or an ether group having at least 5 and up to 100 carbon atoms, with the proviso that at least one group R is not a hydrogen atom.

11. The process of claim 10, wherein the modifier is or contains an amine of the formula $NRH_2$ wherein R is an alkylaryl group having from 10 to 25 carbon atoms or an alkyl group having at least 40 carbon atoms.

12. The process of claim 1, wherein the modifier is polyisobutene-amine (PIB-amine) or 4-tetradecyl aniline.

13. The process of claim 1, wherein the modifier is used in an amount of 5 to 60% of the maximum molar cationic exchange ratio of the total weight of the clay added, and/or the Brønsted acid is used in an amount of 100 to 200% of one molar equivalent of the modifier.

* * * * *

UNITED STATES PATENT AND TRADEMARK OFFICE
CERTIFICATE OF CORRECTION

PATENT NO.       : 8,598,261 B2
APPLICATION NO. : 13/121415
DATED            : December 3, 2013
INVENTOR(S)      : Weng et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 274 days.

Signed and Sealed this
Twenty-second Day of September, 2015

Michelle K. Lee
*Director of the United States Patent and Trademark Office*